Sept. 14, 1948.　　　　B. B. MINNIUM　　　2,449,308
HIGH VOLTAGE CONDENSER

Filed Nov. 23, 1945　　　　　　　　　　2 Sheets-Sheet 1

INVENTOR
BYRON B. MINNIUM
BY
Pennie, Davis, Marvin & Edmonds
HIS ATTORNEYS

Sept. 14, 1948.  B. B. MINNIUM  2,449,308
HIGH VOLTAGE CONDENSER
Filed Nov. 23, 1945  2 Sheets-Sheet 2
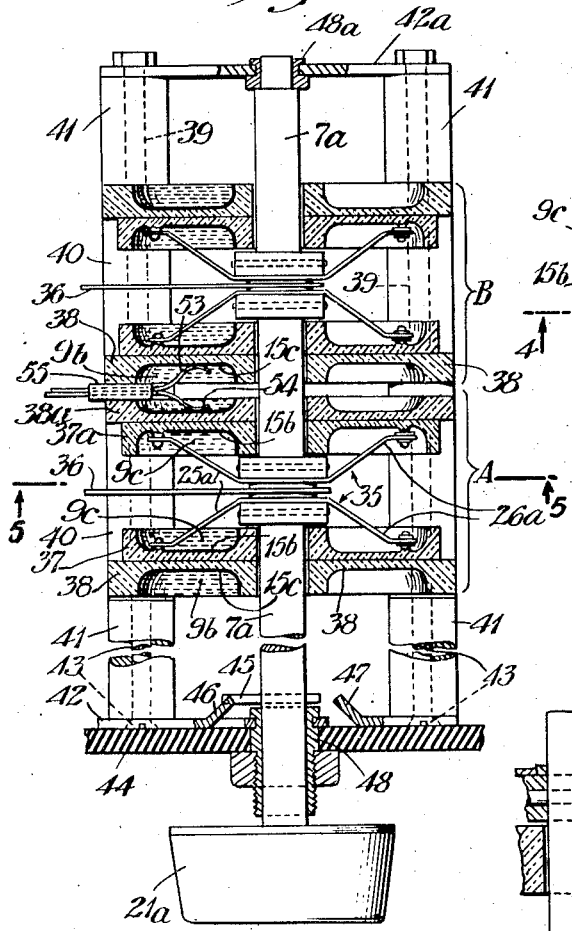
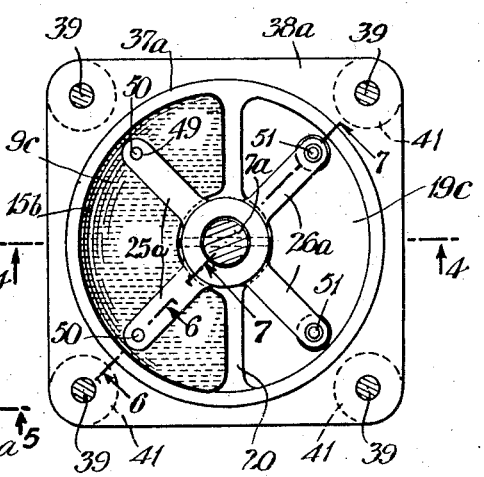
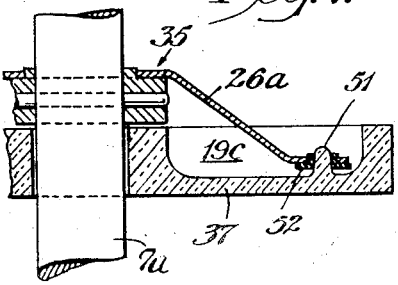
INVENTOR
BYRON B. MINNIUM
BY Pennie, Davis, Marvin & Edmonds
HIS ATTORNEYS Patented Sept. 14, 1948

2,449,308

UNITED STATES PATENT OFFICE 2,449,308

HIGH VOLTAGE CONDENSER

Byron B. Minnium, Erie, Pa., assignor to Erie Resistor Corporation, Erie, Pa., a corporation of Pennsylvania Application November 23, 1945, Serial No. 630,184

5 Claims. (Cl. 175—41.5)

This invention relates to variable condensers and more particularly to an improved rotatable variable condenser of the solid dielectric type adapted to withstand high potential differences between its plates.

In constructing condensers for use in high potential circuits, and particularly where such circuits are operated at high frequencies, it is important to eliminate phenomena such as the corona discharge which, especially at high frequencies, may undesirably affect the apparatus. The prime object of the present invention, therefore, is to provide an improved variable condenser which is so constructed and arranged as to prevent the occurrence of such phenomena.

In one form of variable condenser of this type the rotor and stator elements, made of dielectric material such, for example, as ceramic material, have their contacting faces in intimate gliding contact with one another, these surfaces being ground to a degree of smoothness which will provide such contact. The condenser plates are in the form of metallic films on the outer, non-engaging surfaces of the rotor and stator. In order to provide the condenser plates with corona shields and also to bring the surfaces of the rotor and stator plates into close proximity these films are applied to sector-like depressions formed in the outer surfaces of the rotor and stator elements. Difficulty has been experienced, however, in providing for the rotatable adjustment of the rotor while maintaining face-to-face contact with the stator; and another object of the invention is to eliminate this difficulty and at the same time avoid a construction favorable to the production of corona discharge.

Another object of the invention is to provide a high potential variable condenser of simple arrangement and having a unit construction which is well adapted for use in the gang type of condenser.

The invention will be understood from a consideration of the accompanying drawings illustrating two embodiments thereof by way of example. In these drawings:

Fig. 4 is a view in horizontal longitudinal section of a modification of the condenser unit shown in Fig. 1 arranged in the form of a gang condenser, the section being taken on line 4—4 of Fig. 5;

Fig. 5 is a transverse section taken on line 5—5 of Fig. 4; and

Figs. 6 and 7 are fragmentary sectional views showing details.

Figure 1:
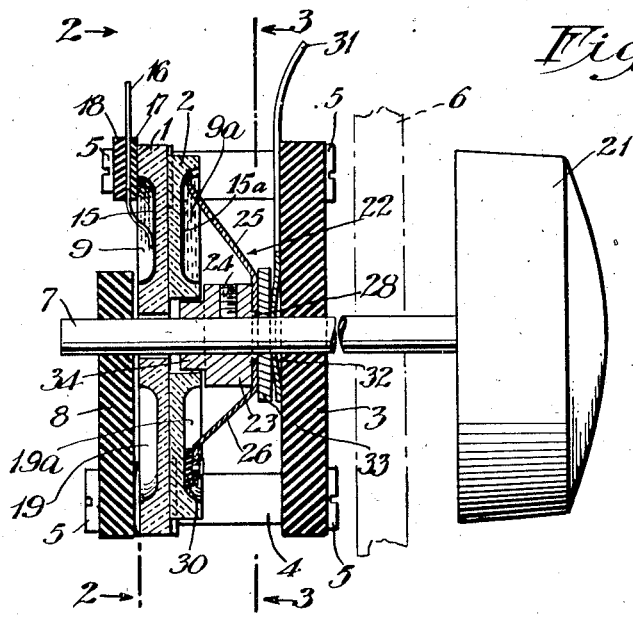
Fig. 1 is a central vertical section of the improved variable condenser.
Figures 2, 3:
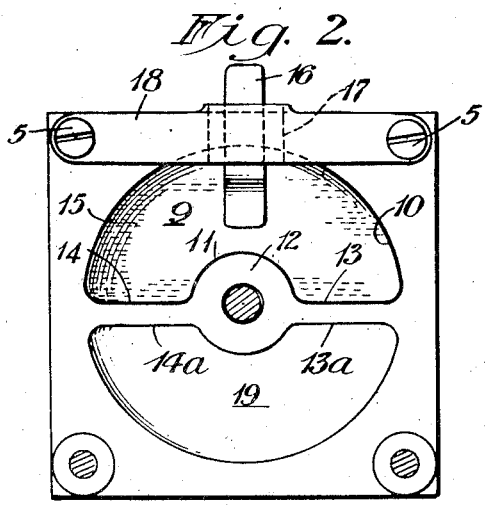
Fig. 2 is a view in transverse section taken on the line 2—2 of Fig. 1.
Fig. 3 is a similar view taken on line 3—3 of Fig. 1 with parts broken away.

Referring now to these drawings, and first to Figs. 1-3, inclusive, the condenser comprises a stator element 1, preferably square in shape, and a rotor element 2 which is preferably a round disk, both of these elements being made preferably of a ceramic material. Rotor 2 is rotatably adjustable with respect to the stator and is mounted with its inner face in contact with the inner face of the stator. These inner faces of both elements are ground to a smooth finish so that when the rotor is adjusted they move in intimate gliding contact.

Stator element 1 is secured to a frame structure comprising a front plate 3 of electrically insulating material such, for example, as a tough resinous plastic composition. Its character and thickness are such as to provide a rigid support for the stator 1 to which it is secured by means of four spacing studs, one at each corner, into the ends of which screws 5 are threaded. Plate 3 may be attached to an instrument panel 6 by any suitable means (not shown).

Rotor 2 is provided with an adjusting shaft 7 which is supported in apertures in plate 3 at the front and in a bracket 8 at the back. Bracket 8 is of insulating material preferably similar to that of plate 3 and is mounted on the frame structure in any suitable manner, as, for example, by means of the lower two screws 5. Shaft 7 passes through a central aperture in stator 1, and rotor 2 is mounted upon the shaft in a manner to be described later on.

Stator 1 in its rear surface has a sector-like depression 9 bounded on its outer side by a substantially half-circular arc 10 (Fig. 2) and on the inside by a concentric arc 11 leaving a hub portion 12 at the center of the stator. The ends of depression 9 are shown as bounded by two radial lines 13 and 14 passing horizontally through the center of shaft 7 thereby making the depression substantially 180° in angular extent in order to obtain the highest condenser capacity.

In depth, depression 9 extends preferably more than half the thickness of stator element 1 so as to place the bottom of the depression as close to the inner face of the stator as is consistent with the required dielectric breakdown strength. Depression 9 is substantially flat throughout its area except at the margins, all of its margins, however, being flared as shown in Fig. 1 and by the shading in Fig. 2.

The stator condenser plate 15 is formed by coating the surface of depression 9 in any desired manner with a metallic film, for example, of silver. This film extends throughout the flat area of the depression and also throughout the flared margins to both the inner and outer rims of the depression (formed by the arcs 10 and 11) and also to the ends of the depression formed by radial lines 13 and 14. These flared portions constitute a corona shield.

The connection terminal for stator condenser plate 15 is a metal strip 16 terminating in a contact spring at its inner end to engage the surface of the condenser plate. Strip 16 is mounted between cleats 17 and 18 fastened to stator 1. These cleats are of an insulating material having a lower dielectric constant than the material of stator 1.

A depression 19 somewhat similar to depression 9, may be provided in the opposite half of the rear surface of stator 1. In the embodiment shown the surface of depression 19 is not coated with metal and it is somewhat smaller in area than depression 9, its straight edges 13a and 14a being parts of a chord parallel with the radial edges 13 and 14. As will appear later, however, depressions 9 and 19 may have equal areas, the straight edges 13 and 14 of the depressions both being parts of chords instead of radial lines.

Rotor element 2 consists of a circular disk preferably of ceramic material having a depression 9a which is geometrically similar to and substantially co-extensive in area with depression 9 of stator 1. Like depression 9, it is bounded by the outer and inner concentric arcs 10a and 11a and by straight edges 13a and 14a, leaving a hub portion 12a at the center of the rotor. Rotor 2 is also preferably provided with a second and similar depression 19a having the same area as depression 19. The ends of depression 19a are separated from the ends 13a and 14a of depression 9a so as to leave strengthening ribs 20 between them. Ribs 20 are parallel to a diametrical line passing through the center of rotor 2.

The surface of depression 9a of rotor 2 is coated with a metallic film to form a condenser plate 15a which is geometrically similar to and substantially coextensive with condenser plate 15 of the stator and is provided throughout its margins with an outwardly curved portion forming a corona shield.

It will be understood that the depth of depression 9a, like that of depression 9, is such as to leave only a thin portion of ceramic material (its thickness being determined by the required dielectric breakdown strength) throughout the flat bottom of the depression so as to bring rotor condenser plate 15a as close to the inner ground face of the rotor as practicable. This places the two condenser plates 15 and 15a as close together as possible when the condenser is adjusted to maximum capacity.

It will be understood that the adjustment of the rotor 2 by turning shaft 7 by means of a knob 21 on its outer end from the position shown in Fig. 1 where the two condenser plates 15 and 15a are in registry, to the position where they have been turned 180° from each other, changes the condenser capacity throughout its range from maximum to minimum.

From the above it will be understood that stator 1 and rotor 2 each have two similar depressions which are coated with metal in pairs to form co-operating condenser plates. One pair is smaller than the other, and the depressions of each pair have the same area and geometric configuration. Thus, depressions 9 of stator 1 and 9a of rotor 2 are of equal area and configuration and constitute one pair, while depressions 19 and 19a are of the same area and geometric configuration but are smaller than the first pair. It will also be understood that when it is desired to provide a condenser having a lower maximum and also a lower minimum capacity the smaller depressions 19 and 19a may be metal coated to form the condenser plates, leaving depressions 9 and 9a uncoated.

For the purpose of mounting rotor 2 on its adjusting shaft 7 in such a way as to maintain the inner ground surfaces of the stator and rotor elements in intimate contact in all positions of angular adjustment of the rotor, and also in order to key the rotor to the shaft, either of two constructions may be employed. These are shown respectively in Figs. 1 to 3 inclusive, and Figs. 4 to 7 inclusive. They may be used interchangeably. In Figs. 1 to 3 a spider 22 of conducting material is provided. This comprises a metal hub 23 which is fixed to shaft 7, for example by means of a set screw 24, and which has at least three, and, as shown in Figs. 1 to 3, four, flexible fingers 25 and 26, fingers 25 being somewhat longer than fingers 26.

Fingers 25 and 26 may be stamped out of suitable flexible resilient material such, for example, as phosphor bronze, and formed with an integral central portion 27. Central portion 27 may have a central aperture which may be slipped over a reduced portion 28 on hub 23, the end of which may be riveted over slightly on the outer surface of central portion 27 to hold the parts together.

Figure 1A:
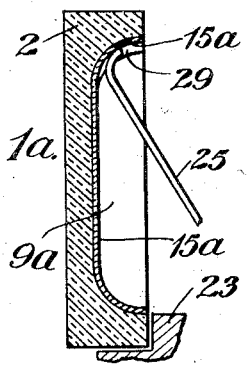
Fig. 1a is a section taken on line 1a—1a of Fig. 3 to show a detail.

The outer ends of fingers 25 are received in two recesses or indentations 29 (Fig. 1a) in depression 9a of rotor 2. The metallic film or coating which forms the rotor condenser plate 15a extends throughout the surfaces of recesses 29. The corona shield portions of condenser plate 15a extend beyond recesses 29 and the ends of fingers 25 to protect them. Electrical contact is made between spider 22 and condenser plate 15a by the ends of fingers 25.

The other pair of fingers 26 of spider 22 bear against the surface of the uncoated depression 19a on the opposite side of ribs 20, and in order to produce a potential gradient between fingers 26 and the surface of this depression thereby again reducing the tendency to the production of corona, buttons or small blocks 30 of insulating material having a lower dielectric constant than the material of which the rotor 2 is made are placed beneath the ends of fingers 26.

The connection terminal for the rotor condenser plate 15a is indicated at 31 and comprises a strip of conductive material of resilient nature which is placed adjacent the inner surface of front plate 3 and at its inner end has an aperture through which adjusting shaft 7 passes. The inner portion of terminal 31 adjacent shaft 7 is slightly dished as shown at 32 in order to constitute a spring to maintain itself in contact with a washer 33 which is interposed between it and the surface of central portion 27 from which fingers 25 and 26 project.

Hub 23 is preferably provided at its left hand or inner end with a reduced portion 34 which forms a hub to assist in assembling the spider 22 and rotor 2. As shown in Fig. 1, however, reduced portion 34 makes a loose fit with the aperture in rotor 2. Also the pressure of fingers 25 and 26 against the surface of the rotor prevents the shoulder at the right of portion 34 from bottoming against the rotor hub. Consequently generous tolerances may be used in the manufacture of the device as it is unnecessary for shaft 7 to be positioned precisely at right angles to the ground inner faces of stator 1 and rotor 2.

It will be understood that rotor 2 is supported on shaft 7 by means of spider 22, its flexible fingers 25 and 26 being biased by the thrust of washer 33 and the inner end of terminal 31 against the surface of rotor 2. Accordingly, the turning of shaft 7 to adjust the capacity of the condenser will effect the rotation of rotor 2 without disturbing its intimate gliding contact with stator 1 and without interrupting the electrical connection between terminal 31 and rotor condenser plate 15a.

Referring to Fig. 4, there is here shown a gang condenser which is made up of four units similar to those shown in Fig. 1. These units each comprising a single pair of stator and rotor elements lend themselves to assembly back to back to form sections as indicated at A and B which can be multiplied to obtain the desired condenser capacity, and to provide the required number of condenser sections for simultaneous tuning of more than one circuit. As sections A and B are alike a description of only one of them will be given.

Referring to section A two spiders 35 are threaded on adjusting shaft 7a and fixed thereon by means of pins as indicated in the dotted lines. Between them are suitable washers and a common terminal 36 for the two rotor condenser plates of the section. Each of these spiders has two pairs of flexible resilient fingers 25a and 26a which, as shown in Fig. 4, are arranged back to back being bent in opposite directions. As few as three and more than four fingers can be used if preferred.

These two spiders 35 support on shaft 7a the respective rotor elements 37 and 37a which are substantially like rotor element 2, a difference however being pointed out further on. The inner faces of each of rotor elements 37 and 37a are arranged to move in intimate gliding contact with the inner faces of two stator elements 38 and 38a, being held in engagement therewith by fingers 25a and 26a.

Stator elements 38 and 38a are of square shape similar to the stator element 1 and are supported upon an elongated frame which also supports the stator elements of section B and which consists of four elongated rods 39 upon which are received spacing collars 40 which serve to space apart the four stator elements. At the opposite ends of rods 39 there are spacers 41 which preferably are of the same length as collars 40.

A front frame member 42 is secured to the ends of the front spacers 41 by the heads of rods 39, this frame serving as a means for securing the condenser to a panel such as indicated at 44 to which the device is to be attached. Shaft 7a is supported in bearings 48 and 48a carried respectively in front frame 42 and in a rear frame member 42a secured to rear spacers 41. It will be understood that adjusting shaft 7a is provided with a turning knob 21a and that also suitable limit stop mechanism is provided. This may be in the form of a pin 45 projecting from one side of shaft 7a and arranged to engage two struck-up portions 46 and 47 of frame 42.

Referring now to Figs. 5, 6 and 7, a modified form of mounting for the rotor elements on the shaft is here shown. This form and that shown in Figs. 1 to 3 may be used interchangeably. The construction of spiders 35 and rotors 37 and 37a is somewhat different from those of Figs. 1 to 3. All four of the fingers 25a and 26a are of the same length and each has adjacent its end a formation 49 preferably consisting of a small aperture.

On the bottom surfaces of depressions 9c of rotors 37 and 37a, two projecting "bumps" or lugs 50 are formed (Figs. 5 and 6). These are rounded protuberances on the flat surfaces of the depressions and they are each covered with the metallic coating or film which forms the rotor condenser plates 15b. This metal film thus extends continuously over the entire depressed area 9c, including lugs 50, in order to prevent the formation of corona. Electrical contact with plates 15b is made by the engagement of formations 49 on fingers 25a with lugs 50.

Two upstanding lugs 51, similar in form to lugs 50, are provided in the unmetallized depression 19c which is formed on each rotor 180° from depression 9c. Over these lugs (Fig. 7) are preferably placed insulating collars 52, and the apertures 49 of fingers 26a are fitted onto the upper reduced ends of such collars. Collars 52 are preferably of a material having a dielectric constant which is less than that of the material of the rotors so as to produce a potential gradient between fingers 25a and the surfaces of the rotors.

The fingers 25a and 26a engaging lugs 50 and 51 support and drive the rotors 37 and 37a allowing their ground surfaces to turn in gliding contact with those of the stator elements.

The connection terminals for the front and rear stator condenser plates 15c are not shown in Fig. 4 but are of the contact spring type as shown in Fig. 1. The connection for the condenser plates 15c of the two adjacent stator elements, 38 of section B and 38a of section A, consists of two opposed contact springs 53 and 54. The shanks of these two springs are clamped between the sections of a split insulating collar 55 which in turn is clamped between the rims of the stator elements 38 and 38a. Insulating collar 55 is made of a material having a dielectric constant which is lower than that of the stator elements.

As in the form of the invention shown in Figs. 1 to 3 inclusive, the stator elements 38 and 38a have two depressed areas 9b and 19b, and both the rotor depressions 9c and 19c and the stator depressions 9b and 19b are preferably of unequal area. In Fig. 4 the metallic coatings forming the several condenser plates have been shown as applied to the larger depressed areas 9b and 9c with the smaller depressed areas 19b and 19c left uncoated. If desired, however, the reverse arrangement may be used, the smaller areas being coated to form condenser plates and the larger areas left uncoated. Then, if it is desired that certain of the sections of the condenser shown in Fig. 4 have lower maximum and lower minimum capacities, this may be accomplished by such reversal.

For example, should it be desired that section B have a lower maximum and lower minimum capacity than section A, the metallic coatings are applied to the smaller depressed areas 19b and 19c of the stator and rotor elements of section B instead of to the larger depressions 9b and 9c. When the elements of such a condenser are assembled, both stator elements are placed in reverse position, that is to say, with the smaller depressions 19b and 19c on the left instead of on the right.

In both forms of the invention described, the thickness of the ceramic material of both the rotor and stator elements between the bottoms of the several depressions and the inner ground and lapped surfaces have been exaggerated for the sake of clearness of illustration. It will be understood, however, that such thickness of both the rotor and stator elements depends wholly on the working voltage of the condenser and the dielectric strength of the material of which the rotor and stator elements are made.

In other words, the material needs to be only of sufficient thickness to prevent puncture of the dielectric by the voltage to be applied between the condenser plates. However, the height of the corona shields is determined not only by the working voltage but by the atmospheric pressure under which the unit is to operate. For example, the corona shields must be higher, that is to say, the depressed areas must be deeper, when the condenser is to operate at high altitudes than when it is to operate only at sea level.

By means of the present invention there is provided a high potential adjustable variable condenser which is extremely smooth in operation and which eliminates the possibility of the production of corona or similar effects. It will be understood that changes may be made in the construction shown in the two embodiments of the invention illustrated without departing from the spirit of the invention and that the scope thereof is set forth in the appended claims.

I claim:

1. In a variable condenser adapted to withstand high potential differences comprising stator and rotor elements of dielectric material having inner faces in contact with one another, a rotor element having sector-like depressions in its outer face, a condenser plate applied to the surface of one of said depressions, an adjusting shaft for the rotor, and a spider of conducting material fixed thereto having at least three resilient fingers engaging said rotor, said fingers constituting the sole means of supporting said rotor in contact with said stator.

2. In a variable condenser adapted to withstand high potential differences comprising stator and rotor elements of dielectric material having inner faces in contact with one another, a rotor element having sector-like depressions in its outer face, at least three lugs projecting from the bottoms of said depressions, a condenser plate applied to the surface of one of said depressions, an adjusting shaft for the rotor, and a spider of conducting material fixed thereto having resilient fingers with formations at their ends in engagement with said lugs, said fingers constituting the sole means of supporting said rotor in contact with said stator.

3. In a variable condenser adapted to withstand high potential differences comprising stator and rotor elements of dielectric material having inner faces in contact with one another, a rotor element having sector-like depressions in its outer face, a condenser plate applied as a metallic coating to the surface of one of said depressions, at least three lugs projecting from the outer face of the rotor, some on said rotor condenser plate and some on the uncoated portion of the rotor, an adjusting shaft for the rotor, and a spider of conducting material fixed thereto having resilient fingers with formations at their ends in engagement with said lugs, the fingers engaging the lugs on said condenser plate making electrical contact therewith through said lugs and the remaining fingers having material interposed between them and the lugs on the uncoated rotor surface of lower dielectric constant than said rotor, said fingers constituting the sole means of supporting said rotor in contact with said stator.

4. In a variable condenser adapted to withstand high potential differences comprising stator and rotor elements of dielectric material having inner faces in contact with one another, a rotor element having sector-like depressions in its outer face, a recess in one of said depressions disposed wholly within the periphery of the flared margin thereof, a condenser plate applied to the surface of said depression and said recess, an adjusting shaft for the rotor, and a spider of conducting material fixed thereto having at least three resilient fingers, one of which is in engagement with said recess and the remainder of said fingers engaging said rotor through blocks of material of a lower dielectric constant than said rotor, said fingers constituting the sole means of supporting said rotor in contact with said stator.

5. In a variable condenser adapted to withstand high potential differences, a stator element, and a rotor element in contact therewith comprising a disk of dielectric material having two sector-like depressions in one face thereof, said depressions having flat bottom surfaces with flared margins, a condenser plate applied as a metallic coating to the surface of one of said depressions including the flared margins thereof thereby forming a corona shield, an adjusting shaft for the rotor arranged to rotate substantially at right angles thereto and a spider of conducting material fixed to said shaft, said spider having at least three resilient radially projecting fingers, one of said fingers being biased into engagement with said rotor condenser plate within the periphery of said corona shield, and the remaining fingers being biased into engagement with said uncoated depression within the flared margin thereof, said fingers constituting the sole means of supporting said rotor in contact with said stator.

BYRON B. MINNIUM.

REFERENCES CITED

The following references are of record in the file of this patent:

UNITED STATES PATENTS

| Number | Name | Date |
|---|---|---|
| 1,588,671 | Gerber | June 15, 1926 |
| 2,098,597 | Saar | Nov. 9, 1937 |
| 2,251,995 | Godsey | Aug. 12, 1941 |
| 2,326,341 | Ehlers | Aug. 10, 1943 |

FOREIGN PATENTS

| Number | Country | Date |
|---|---|---|
| 525,018 | Great Britain | Aug. 20, 1940 |